Dec. 26, 1967 W. KOHLHAGEN 3,360,704

SPRING-TYPE ELECTROMECHANICAL OSCILLATOR

Filed April 22, 1965

INVENTOR
Walter Kohlhagen
BY
Attorney.

United States Patent Office 3,360,704

Patented Dec. 26, 1967

3,360,704

SPRING-TYPE ELECTROMECHANICAL OSCILLATOR

Walter Kohlhagen, 818 Oakley Ave.,
Elgin, Ill. 60120

Filed Apr. 22, 1965, Ser. No. 450,149
17 Claims. (Cl. 318—128)

ABSTRACT OF THE DISCLOSURE

The disclosure relates to an oscillator which comprises a support, an inertia member, and a longitudinal leaf-type spring element carrying the inertia member and being mounted on the support so that a flexible length of the element connects the inertia member and support. This flexible length of the element lies in any oscillator position substantially in a plane, and the inertia member is arranged to have its center of gravity substantially midway of the flexible length of the element, so that in operation of the oscillator this flexible length will flex in S-fashion and the inertia member will have substantially rectilinear motion.

This invention relates to oscillators in general, and to spring-type oscillators in particular.

Among the most frequently used oscillators of this type are those having their springs and inertia elements so arranged that the latter will have operational back-and-forth rotary motion about an axis. However, while these oscillators perform in general satisfactorily for most purposes, including control over timing functions owing to their fair-to-good isochronal performance, they are rather too sensitive to gravitational, shock, vibrational and other forces to which they are subjected in operation, with the result that at least their isochronal performance is adversely affected all too readily in different oscillator positions or by the forces just mentioned, including inevitable variations of the applied impulse forces.

It is among the objects of the present invention to provide an oscillator of this type the isochronal performance of which, besides being in general as good, or even better, than that of the prior oscillators, is adversely affected much less, if at all, in different oscillator positions or by the aforementioned forces to which the oscillator is subjected.

It is another object of the present invention to provide an oscillator of this type which has the aforementioned superior isochronal performance under any and all operating conditions, yet is of exceedingly simple construction and readily lends itself to highly efficient and low-cost mass production.

It is a further object of the present invention to provide an oscillator of this type in which the spring is longitudinally flexible, and the spring and inertia element, which form the oscillatory unit, are so arranged that the inertia element will have operational back-and-forth motion or reciprocation in a substantially rectilinear path, while the spring will flex back and forth. With this arrangement, the spring will in its operational flexure most readily respond to the applied impulse forces to store energy and then release this energy to the inertia element so as reliably to sustain oscillation of the unit at its natural frequency, while the inertia element will, as a result of its subjection to the aforementionel disturbing forces, have at the most an inconsequential urgency to deviate from its motion path and only a slight urgency to pass beyond its motion range, owing to its operating motion in the featured rectilinear path. Thus, isochronal performance of the oscillator is to all practical intents and purposes unaffected in different oscillator positions and under ordinary operating conditions.

Another object of the present invention is to provide an oscillator of this type in which the spring is, as in some prior oscillators, firmly mounted at one end and carries the inertia element at the other end,, but the spring and inertia element are, as a prerequisite to achieving motion of the inertia element in the aforementioned substatially rectilinear path, arranged so that the spring will in operation act, not in simple flexure, but rather in compound or S-like flexure at which the ends of the spring will always remain in substantial parallelism. With this arrangement, the inertia element cannot turn about an axis of its own or any transverse axis of the spring, but is compelled to operate in a path which to all practical intents and purposes is a rectilinear path since the inertia element deviates from the latter only by its constant but exceedingly small, and hence inconsequential, creep to and from this path ensuing from the equally small creep of the free spring end toward and from the mounted end thereof in operational flexure of the spring.

A further object of the present invention is to provide an oscillator of this type in which, for the aforementioned operational S-like flexure of the spring with its ends in substantial parallelism, the inertia element is so located relative to the spring that it will set up in the free spring end at which it is carried two couples which is non-flexed or any flexed condition of the spring are of identical magnitude but of opposite sign and, hence, balance each other. This is achieved by locating the inertia element with its center of gravity midway of the flexible length of the spring.

It is another object of the present invention to provide an oscillator of this type with the aforementioned rectilinear motion path of the inertia element, in which the impulse forces are applied to the inertia element in the direction of its rectilinear motion path, whereby the impulse forces drive the oscillator with optimum effect but have no tendency whatever to urge the inertia element from its rectilinear motion path.

It is a further object of the present invention to provide an oscillator of this type which is particularly reliable in its isochronal performance under all operating conditions and also has high rate stability for a very long time. This is achieved by arranging the spring in longitudinal sections side-by-side and in series connection with each other, with the endmost spring sections being mounted and carrying the inertia element, respectively. In thus arranging the spring in series sections, the maximum stress in the spring may be kept very low for a given amplitude of oscillation, which makes for rate stability for a long time and avoids spring breakage. This spring arrangement also permits the use of a spring of greater stiffness by added spring material which also increases the size of the spring and thus facilitates and permits its production and assembly with the other parts at permissible wider tolerances. Furthermore, if the spring has an even number of sections, the operating motion of the inertia element is virtually without any deviation from a rectilinear path despite the aforementioned longitudinal creep of the free spring end in spring action, because such creep is in the present sectioned spring in opposite directions and over virtually the same distances so as to have virtually no effect to shift the inertia element from its rectilinear motion path.

Another object of the present invention is to provide an oscillator of this type which affords the ultimate in reliable isochronal performance under all operating conditions, in that the spring will, on increasing amplitude of oscillation, generate energy to keep the inertia element at its same natural frequency of oscillation despite its increased amplitude of oscillation. This is achieved by interposing the inertia element between and connecting it with the free ends of two springs that extend on opposite sides of the inertia element in opposite directions to each other from their respective mounted ends. Thus, the springs, while having the same flexing action in operation, are by the rigid connecting inertia element additionally stressed increasingly the farther they flex from their non-flexed positions owing to their extent in opposite directions, and it is this increasing and special stress in the springs which not only opposes increase of the amplitude of oscillation from any cause with more than ordinary urgency, but also adds to the recovery forces of these springs to keep the oscillation at the same natural frequency even if the amplitude of oscillation increases. Also, if the springs are of identical length as preferred, the inertia element will have its operational movement in a truly rectilinear path, because the operational longitudinal creeps of the free spring ends insofar as permitted by the interposed inertia element are over exactly the same distances and in opposite directions and, hence, cancel each other.

Further objects and advantages will appear to those skilled in the art from the following, considered in conjunction with the accompanying drawings.

In the accompanying drawings, in which certain modes of carrying out the present invention are shown for illustrative purposes:

FIG. 1 is a plan view of an oscillator embodying the present invention;

FIG. 2 is a side view of the same oscillator;

FIG. 3 is a section through the oscillator in action, taken substantially along the line 3—3 of FIG. 1;

FIG. 4 is a plan view of an oscillator embodying the present invention in a modified manner;

FIG. 5 is a section through the modified oscillator as taken along the line 5—5 of FIG. 4, with the oscillator being applied for an exemplary drive of a clock or the like;

FIG. 6 is a plan view of an oscillator embodying the present invention in another modified manner;

FIG. 7 is a cross-section through the oscillator of FIG. 6 as taken along the line 7—7 thereof;

FIG. 7A is an enlarged fragmentary section through a modified mounting of the oscillator of FIG. 6;

FIG. 8 is a plan view of an oscillator embodying the present invention in a further modified manner;

FIG. 9 is a section through this further modified oscillator in action, as taken along the line 9—9 of FIG. 8;

FIG. 10 is a plan view of an oscillator which is similar to, but somewhat modified from, the oscillator of FIG. 8;

FIG. 11 is a section through the oscillator of FIG. 10 as taken along the line 11—11 thereof;

FIG. 12 is a plan view of an oscillator embodying the present invention in still another modified manner;

FIG. 13 is a section through the oscillator of FIG. 12 as taken along the line 13—13 thereof; and FIG. 14 is a plan view of an oscillator which is similar to, but somewhat modified from, the oscillator of FIG. 12.

Figures 1, 2, 3, 4, 5, 6, 7, 7A, 8, 9, 10, 11, 12, 13, 14:
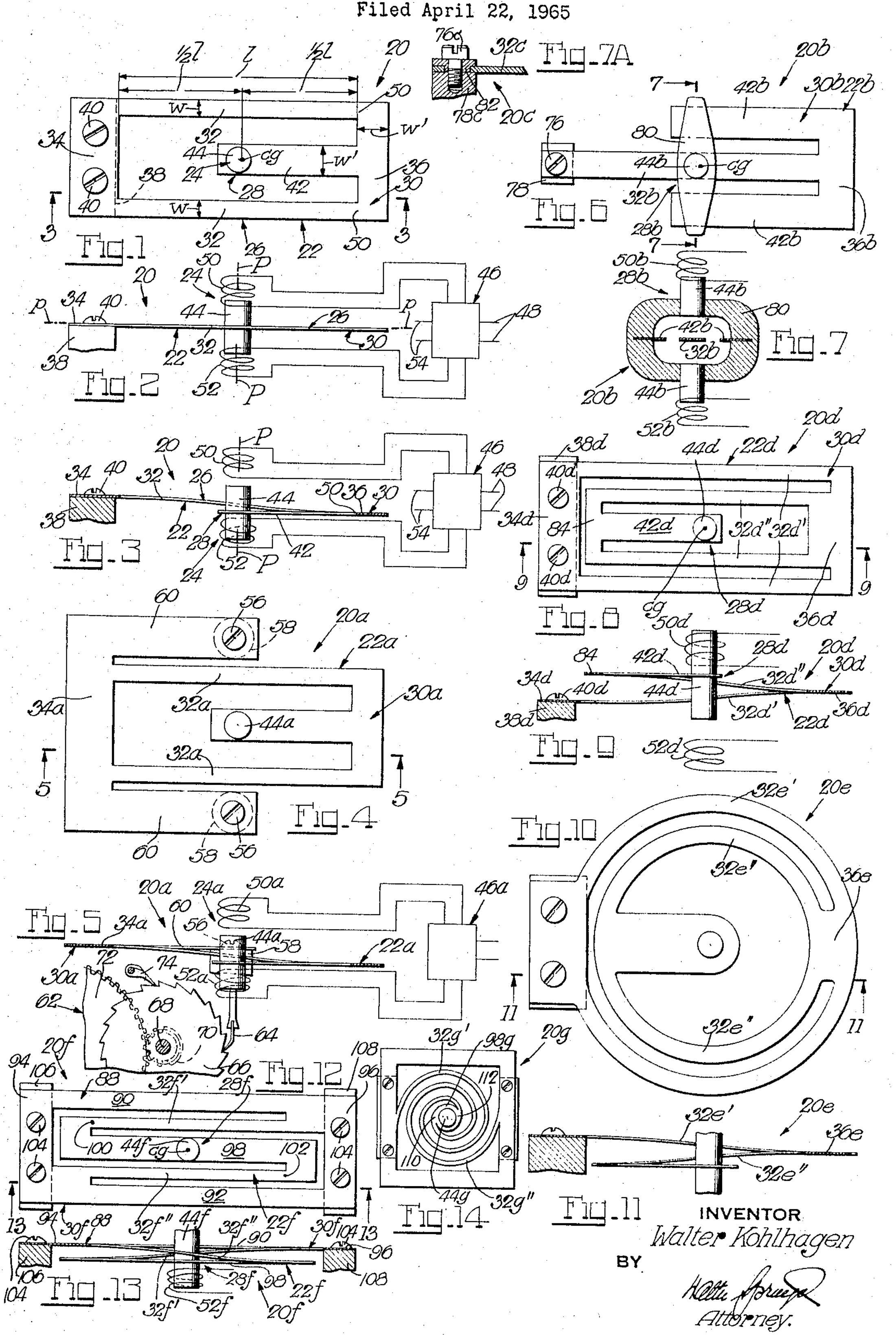

Referring to the drawings, and more particularly to FIGS. 1 to 3 thereof, the reference numeral 20 designates an oscillator which provides as its major components an oscillatory unit 22 and impulsing means 24 therefor. The oscillatory unit 22 comprises a longitudinal leaf-type spring 26 and an inertia member 28 of which the spring and part of the inertia member are preferably and advantageously blanked in a single piece 30 from slightly resilient metal plate stock of uniform thickness. The exemplary blanked piece 30 provides the spring 26 in the form of two spaced parallel reeds 32 which are joined by end connectors 34 and 36, with the reeds 32 being mounted in cantilever fashion on a fixed support 38 through intermediation of the end connector 34 and screws 40. The part of the inertia member 28 embodied in the blanked piece 30 is formed by the other end connector 36 and an arm 42 extending rearwardly therefrom centrally between the reeds 32, while the remaining part of the inertia member is formed by a bar 44 which is carried by the arm 42. The reeds 32 of the blanked piece 30 are resiliently flexible by virtue of their relatively narrow width *w*, while the inertia elements 36 and 42 of the piece 30 are rigid by virtue of their greater width *w'*.

The impulsing means 24 comprise, in this instance, a conventional pick-up and drive coil amplifier 46 supplied with D.C. through the leads 48, and the bar 44 which is a permanent-magnet of opposite polarities at its opposite ends and cooperates with the pick-up and drive coils 50 and 52, with the magnetic field set up on each current flow in the drive coil 52 impulsing the oscillatory unit 22 as a result of the current induced in the pick-up coil 50 on each pass of the bar magnet 44 thereinto, as will be readily understood.

The mass of the inertia member 28 is preferably so arranged that the reeds 22 will in any oscillator position remain substantially in the plane *p* of the blanked piece 30 when the oscillatory unit 22 is in idle condition (FIG. 2). The unit 22, which is self-starting on supplying the amplifier 46 with D.C., responds to the impulsing means 24 in oscillation at its natural frequency, as will be readily understood. In operation of the oscillator, i.e., oscillation of the unit 22, the reeds 22 alternately flex to opposite sides of the plane *p* of the blanked piece 30, with each flexure of the reeds being, in accordance with one important aspect of the present invention, in typical S-fashion (FIG. 3) owing to the general rearward extension of the inertia member 28 from the free or front ends 50 of the reeds and resulting set-up at any time of two counteracting couples in these free reed ends 50. Moreover, and in accordance with another important aspect of the present invention, the inertia member 28 is so arranged that its center of gravity *cg* lies midway, or at least substantially midway, of the flexible length *l* of the reeds 32 (FIG. 1). In thus arranging the inertia member 28, the couples of opposite sign set up by the latter at any instant in the free reed ends 50 are also of identical magnitude and, hence, balance each other at any instant, with the result that at any operational flexure of the reeds 32 the end connector 36 and arm 42 will lie in a plane parallel to the plane *p* of the blanked piece 30 (FIG. 3).

The arrangement of the inertia member 28 in relation to the reeds 32 as described, secures the important advantage of confining the operational motion of the inertia member 28 to a rectilinear path rather than a rotary path, to the ultimate end of obtaining true isochronal performance of the oscillator which is virtually unaffected in different oscillator positions and by gravitational, shock, vibrational and other forces to which the oscillator is or may be subjected in operation. Obviously, with the inertia member 28 and reeds 32 arranged as described, the inertia member in oscillation will not turn about an axis of its own or any transverse axis of the reeds, but is compelled to operate in a path P which to all practical intent and purposes is a rectilinear path normal to the plane *p* of the blanked piece 30 (FIGS. 2 and 3) since the inertia member deviates from a true rectilinear path only by its constant but exceedingly small, and hence inconsequential, creep to and from such true path ensuing from the equally small creep of the free reed ends 50 toward and from the support 38 in operational flexure of the reeds. Thus, with the reeds 32 acting in S-flexure in oscillation of the unit 22 they will most readily respond to the applied impulse forces to store energy and then release this energy to the inertia member 28 so as reliably to sustain oscillation of the unit 22 at its natural frequency, while the inertia member will, as a result of its subjection to the aforementioned disturbing forces and in different oscillator positions, have at the most an inconsequential urgency to deviate from its motion path and only a minimum urgency to pass beyond its motion range, owing to its operating motion in the featured rectilinear path. Further, with the inertia member 28 operating in the featured rectilinear path and the impulse forces being applied to the inertia member in the direction of this rectilinear path, the impulse forces drive the oscillator with optimum effect but have no tendency to urge the inertia member from its rectilinear motion path. Thus, position error, i.e., error in the oscillator's performance in different oscillator positions, is virtually eliminated, and variations in the unit's frequency of oscillation pursuant to variations in the amplitude of oscillation are rather slight at the most, wherefore isochronal performance of the oscillator is to all practical intents and purposes unaffected under all ordinary and even rather severe operating conditions.

The oscillator 20 may be applied to any useful purpose. For example, the same may be used for operating a clock, such as an auto clock with a synchronous motor (not shown) which through leads 54 is supplied with the output of the amplifier 46, with this output being current of the frequency of the oscillator.

Reference is now had to FIGS. 4 and 5 which show a somewhat modified oscillator 20*a* that differs from the described oscillator 20 of FIGS. 1 to 3 in that the oscillatory unit 22*a* is at 56 mounted on fixed supports 58 through intermediation of preferably rigid arm extensions 60 on the end connector 34*a* of the blanked piece 30*a*. With this arrangement, the fixed mounting of the oscillatory unit 22*a* on the supports 58 is sufficiently removed from the reeds 32*a* to exert no possible force on the latter that might interfere even in the slightest with the natural operational S-flexure of these reeds. The impulsing means 24*a* (FIG. 5) are in this instance the same as the described impulsing means 24 in FIGS. 2 and 3, with the pick-up and drive coils 50*a* and 52*a* of the amplifier 46*a* cooperating with the bar magnet 44*a*.

The present oscillator 20*a* serves in this example as the prime mover of a time movement 62. To this end, the bar magnet or armature 44*a* carries a pawl 64 which cooperates with a ratchetwheel 66 on a shaft 68. Turning with the ratchetwheel 66 is a pinion 70 and gear 72 being parts of the gear train of the movement for operating the usual time-indicating hands in front of a time dial (neither shown). Also cooperating with the ratchetwheel 66 is a locking pawl 74 which prevents rotation of the ratchetwheel in anticlockwise direction but permits its normal operational rotation in clockwise direction by the driving pawl 64. Thus, the ratchetwheel 66 is with each oscillation of the unit 22*a* to the extreme position in FIG. 5 indexed one tooth, and this step-by-step motion of the ratchetwheel drives the gear train of the movement.

Reference is now had to FIGS. 6 and 7 which show another modified oscillator 20*b* that differs from the described oscillators 20 and 20*a* in that the blanked piece 30*b* provides a single or undivided resilient reed 32*b* mounted at 76 with one end on a support 78, and two rigid arms 42*b* which flank the reed 32*b* and extend rearwardly from a rigid end connector 36*b*. The inertia member 28*b* is formed in this instance by the rigid parts 42*b* and 36*b* of the blanked piece 30*b*, a preferably non-magnetic loop-like element 80 which is carried by the arms 42*b* in the fashion shown in FIG. 7, and aligned bar magnets 44*b* which are carried by the element 80. The described parts of the inertia member 28*b* are so arranged that the center of gravity *cg* of the latter lies midway of the flexible length of the reed 32*b*. The bar magnets 44*b* cooperate in this instance with pick-up and drive coils 50*b* and 52*b* of an amplifier for impulsing the oscillatory unit 22*b*.

Reference is now had to FIG. 7A which shows part of an oscillator 20*c* that may in all respects be the oscillator 20*b* of FIGS. 6 and 7, except that it also shows an expediency which may be applied to all disclosed oscillators. This expediency permits adjustment of the effective flexible length of the reed for the exemplary purpose of bringing the center of gravity of the inertia member more or less exactly midway of the flexible length of the reed if need be after assembly of the oscillator for its isochronal performance. To this end, the reed 32*c* is at 76*c* mounted on the support 78*c* through intermediation of an eccentric bushing 82 which on turning adjustment shifts the reed 32*c* on the support 78*c* and thus adjusts the effective flexible length of the reed.

Reference is now had to FIGS. 8 and 9 which show another modified oscillator 20*d* the oscillatory unit 22*d* of which has, in contrast to the divided or non-divided single reeds of the described oscillators 20 to 20*c*, plural reeds 32*d'* and 32*d''* in series connection with each other. To this end, the blanked piece 30*d* has the exemplary divided sections 32*d'* of one reed in series connection with the divided sections 32*d''* of the other reed at the rigid end connector 36*d*, with the opposite end connector 34*d* being at 40*d* mounted on the support 38*d*. The free ends of the divided reed sections 32*d''* are joined by a rigid connector 84 from which extends the rigid arm 42*d* that carries the bar magnet 44*d* which cooperates with the pick-up and drive coils 50*d* and 52*d* (FIG. 9) of an amplifier (not shown) for impulsing the oscillatory unit 22*d*. The inertia member 28*d*, being essentially formed by the end connector 36*d* and arm 42*d* of the blanked piece 30*d* and by the bar magnet 44*d*, is arranged so that the center of gravity *cg* thereof lies as nearly as possible midway of the flexible lengths of the divided reed sections 32*d'* and 32*d''*.

The present oscillator 20*d* performs in the manner shown in FIG. 9, i.e., the divided reed sections 32*d'* and 32*d''* have individual operational S-flexure, with the arm 42*d* lying at any operational flexure of the reed sections in a plane parallel to the plane of the blanked piece 30*d*. The oscillator 20*d*, besides having the same advantages as the oscillators 20 to 20*c*, is particularly reliable in its isochronal performance under all operating conditions, including different oscillator positions, and also has a high rate stability for a long time. Thus, by arranging plural reeds side-by-side and in series connection with each other, the maximum stress in the reeds may be kept very low for a given amplitude of oscillation, which makes for rate stability for a long time and avoids reed breakage. This plural reed arrangement also permits the use of reeds of greater stiffness by added spring material which increases the size of the reeds and thus facilitates and permits their production and also assembly with the other parts at permissible wider tolerances. Furthermore, if the plural reeds are of an even number, as in the present oscillator 20*d* with its exemplary two divided reeds, the operating motion of the inertia member 28*d* is virtually without any deviation from a rectilinear path despite the aforementioned longitudinal creep of a free reed end in reed action, because such creep is in the present two series-connected reeds in opposite directions and over virtually the same distances so as to have virtually no effect to shift the inertia member from a true rectilinear motion path.

FIGS. 10 and 11 show an oscillator 20*e* which is in all respects like the oscillator 20*d* just described, except that the reed sections 32*e'* and 32*e''* are formed part-circular and arranged in spaced concentric relation with each other, with these reed sections 32*e'* and 32*e''* being in series connection with each other at the end connector 36*e*. The present oscillator 20*e* performs the same as, and has all the advantages of, the described oscillator 20*d* of FIGS. 8 and 9.

Reference is now had to FIGS. 12 and 13 which show a further modified oscillator 20*f* that differs from all previously described oscillators 20 to 20*e* in that the oscillatory unit 22*f* has two flexible reeds 32*f'* and 32*f''*, and the inertia member 28*f* is interposed between and connected with the free ends of these reeds which extend on opposite sides of the inertia member in opposite directions to each other from their respective mounted ends. Thus, the exemplary blanked piece 30*f* comprises in this instance a rigid rectangular frame 88 with opposite side pieces 90 and 92 and opposite end pieces 94 and 96, the flexible reeds $32f'$ and $32f''$ and the rigid arm 98, of which the reeds $32f'$ and $32f''$ extend from the frame 88 near the respective end pieces 96 and 94 thereof parallel to each other and in opposite directions and are at their respective free ends 100 and 102 continuous with the interposed arm 98, with the reeds $32f'$ and $32f''$ being preferably arranged to be of identical length and coextensive with each other longitudinally of the blanked piece $30f$. The frame 88 of the blanked piece $30f$ is with its end pieces 94 and 96 mounted at 104 on supports 106 and 108. The inertia member $28f$ comprises, in this instance, the arm 98 of the blanked piece $30f$ and a bar magnet $44f$ which is carried by the arm 98 and cooperates with the pick-up and drive coils of an amplifier of which only the drive coil $52f$ is shown in FIG. 13. The inertia member $28f$ is arranged so that its center of gravity *cg* lies as closely as possible midway of the length of the flexible reeds $32f'$ and $32f''$.

The present oscillator $20f$ performs in the manner depicted in FIG. 13, i.e., the reeds $32f'$ and $32f''$ have individual operational S-flexure, with the flexure of both reeds being at any instant either to one side or the other side of the plane of the blanked piece $30f$, and the arm 98 lying at any operational flexure of the reeds in a plane parallel to the plane of the blanked piece $30f$. The present oscillator $20f$, besides having all the advantages of the described oscillators 20 to $20e$, affords the ultimate in isochronal performance. Thus, the reeds $32f'$ and $32f''$, while having the same flexing action in operation, are by the rigid connecting arm 98 additionally stressed increasingly the farther they flex from their non-flexed condition owing to their extent in opposite directions, and it is this increasing and special stress in the reeds which not only opposes increase of the amplitude of oscillation from any cause with more than ordinary urgency, but also adds to the recovery forces of these reeds to keep the oscillation of the unit $22f$ at the same natural frequency even if the amplitude of oscillation increases. Accordingly, the reeds in operation generate adequate energy effectively to oppose increased amplitude of oscillation of the unit $22f$ from any cause whatever, and to keep the unit $22f$ substantially at its same natural frequency even if its amplitude of oscillation should increase. Moreover, if the reeds $32f'$ and $32f''$ are of identical length as preferred, the inertia member $28f$ will have its operational motion in a true rectilinear path, because the operational creeps of the free reed ends insofar as permitted by the interposed rigid arm 98 are over exactly the same distances and in opposite directions and, hence, cancel each other.

Reference is finally had to FIG. 14 which shows an oscillator $20g$ that is in all respects like the oscillator $20f$ of FIGS. 12 and 13, except that the flexible reeds $32g'$ and $32g''$ extend spirally, with their free ends being at 110 and 112 continuous with the interposed rigid arm $98g$ that carries the bar magnet $44g$. The present oscillator $20g$ performs the same as, and has all the advantages of, the oscillator $20f$ of FIGS. 12 and 13.

While in the described oscillators the oscillatory unit is magnetically impulsed, it is, of course, fully within the purview of the present invention to impulse the oscillatory unit in any other conventional manner.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. An oscillator, comprising a rigid inertia member; a single longitudinal leaf-type spring carrying said member; a support on which said spring is mounted so that said member and support are connected by a flexible length of said spring, said flexible spring length and member together forming an oscillatory unit, and said flexible spring length wholly lying in any oscillator position substantially in a single plane when said unit is in repose position, with said member being arranged to have its center of gravity substantially midway of said spring length so that in oscillation of said unit said flexible spring length will flex in S-fashion and every part of said member will move substantially through the same distance in a direction substantially normal to said plane; and means for impulsing said unit for oscillation of the same at its natural frequency.

2. An oscillator as set forth in claim 1, which further comprises turnable means on said support connected with said spring for longitudinal adjustment of said spring on said support to regulate said flexible spring length.

3. An oscillator, comprising a support; a single plane blanked metal leaf having a resiliently flexible longitudinal leg part and a continuing rigid arm part at one end of said leg part extending rearwardly and alongside said leg part and having a free end, said leg part being mounted with its other end on said support so that the length of said leg part between said one end thereof and said support acts like a leaf spring; a member carried by said arm part and forming therewith an inertia mass, said leaf spring and inertia mass together forming an oscillatory unit, and said leaf spring lying in any oscillator position substantially in the plane of said leaf when said unit is in repose position, with said inertia mass being arranged to have its center of gravity substantially midway of the length of said leaf spring so that in oscillation of said unit said leaf spring will operationally flex in S-fashion and said arm part will at any operational flexure of said leaf spring lie in a plane substantially parallel to said plane of the leaf; and means for impulsing said unit for oscillation of the same at its natural frequency.

4. An oscillator as set forth in claim 3, in which one of said parts is formed in spaced sections on opposite sides of the other part.

5. An oscillator as set forth in claim 3, in which said member is a bar magnet of permanent opposite polarities on opposite sides of the plane of said arm part, and said impulsing means include said magnet and an amplifier with pick-up and drive-coils cooperating with said magnet.

6. An oscillator as set forth in claim 3, in which said leaf is of uniform thickness throughout and said leg and arm parts are of smaller and greater width to be resiliently flexible and rigid, respectively, and one of said parts is formed in spaced sections on opposite sides of the other part.

7. An oscillator as set forth in claim 6, in which said leaf has a longitudinal axis, and said parts and member are congruent about said axis.

8. An oscillator as set forth in claim 6, in which said leaf has a longitudinal axis, said parts and member are congruent about said axis, and said other part and said sections of said one part extend substantially parallel to each other and to said axis.

9. An oscillator as set forth in claim 6, in which said one part is said leg part.

10. An oscillator as set forth in claim 6, in which said one part is said arm part.

11. An oscillator as set forth in claim 6, in which said one part is said leg part, and each of said sections thereof is formed by an even number of independently resiliently flexible longitudinal reeds arranged side-by-side and in series continuity with each other, of which the reeds of each section are continuous with said arm part and mounted on said support, respectively.

12. An oscillator as set forth in claim 6, in which said leaf has a longitudinal axis, said one part is said leg part, and each of said sections thereof is formed by independently resiliently flexible longitudinal reeds arrtnged side-by-side in parallelism with each other and said axis and in series continuity with each other, of which the endmost reeds of each section are continuous with said arm part and mounted on said support, respectively.

13. An oscillator as set forth in claim 6, in which said one part is said leg part, and each of said sections thereof is formed by independently resiliently flexible reeds extending part-circular in spaced concentric relation and in series continuity with each other, of which the endmost reeds of each section are continuous with said arm part and mounted on said support, respectively.

14. An oscillator, comprising a rigid longitudinal inertia member; longitudinal leaf-like springs connected at one end with the opposite ends, respectively, of said member and extending therefrom in opposite directions on opposite sides of and alongside said member; spaced supports on which said springs are mounted with their other ends so that said supports and member are connected by flexible lengths of said springs, said flexible spring lengths and member together forming an oscillatory unit, and said flexible spring lengths lying in any oscillator position substantially in a first plane when said unit is in repose position, with said member being arranged to have its center of gravity in a plane normal to said first plane and intersecting said flexible spring lengths substantially midway thereof so that in oscillation of said unit said flexible spring lengths flex in S-fashion and every part of said member moves substantially through the same distance in a direction substantially normal to said first plane; and means for impulsing said unit for oscillation of the same at its natural frequency.

15. An oscillator, comprising a plane blanked metal leaf having a rigid arm and resiliently flexible legs continuous with said arm at its opposite ends and extending in opposite directions on opposite sides of and alongside said arm; spaced supports on which said legs are mounted so that flexible lengths of the latter connect said arm and supports; a member carried by said arm and forming therewith an inertia mass, said mass and flexible leg lengths together forming an oscillatory unit, and said flexible leg lengths lying in any oscillator position substantially in the plane of said leaf when said unit is in repose position, with said inertia mass being arranged to have its center of gravity in a plane normal to said plane of the leaf and intersecting said flexible leg lengths substantially midway thereof so that in oscillation of said unit said flexible leg lengths will operationally flex in S-fashion and said arm will at any operational flexure of said leg lengths lie in a plane substantially parallel to said plane of the leaf; and means for impulsing said unit for oscillation of the same at its natural frequency.

16. An oscillator as set forth in claim 15 in which said leaf has a longitudinal axis, said arm and legs extend parallel to each other and to said axis, and said flexible leg lengths are of the same length and longitudinally coextensive.

17. An oscillator as set forth in claim 15, in which said flexible leg lengths extend spirally between said arm and the respective supports.

References Cited

UNITED STATES PATENTS

| | | | |
|---|---|---|---|
| 3,192,702 | 7/1965 | Kato et al. | 58—23 |
| 3,201,932 | 8/1965 | Sparing et al. | 310—25 X |
| 3,308,361 | 3/1967 | Nakai et al. | 310—25 X |
| 3,170,278 | 2/1965 | Stutz | 58—23 |

MILTON O. HIRSHFIELD, *Primary Examiner.*

D. F. DUGGAN, *Assistant Examiner.*